Figure 1:
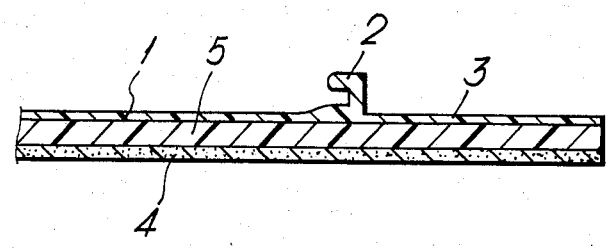

United States Patent [19]

Overbergh et al.

[11] Patent Number: 4,521,470
[45] Date of Patent: Jun. 4, 1985

[54] DIMENSIONALLY HEAT RECOVERABLE ARTICLE

[75] Inventors: Noel M. M. Overbergh, Bertem; Jos Doucet, Kessel-Lo; Jan Vansant, Heverlee, all of Belgium

[73] Assignee: N.V. Raychem S. A., Belgium

[21] Appl. No.: 517,542

[22] Filed: Jul. 27, 1983

[30] Foreign Application Priority Data

Jul. 26, 1982 [GB] United Kingdom ............... 8221539

[51] Int. Cl.³ ........................................... B29C 27/00
[52] U.S. Cl. ............................ 428/36; 174/DIG. 8;
156/84; 156/86; 156/85; 428/212
[58] Field of Search ............... 174/DIG. 8; 403/273;
285/381; 156/84, 85, 86; 428/36, 212

[56] References Cited

U.S. PATENT DOCUMENTS 4,195,106 3/1980 Brusselmans ............... 174/DIG. 8

FOREIGN PATENT DOCUMENTS 2424345 7/1975 Fed. Rep. of Germany.. 174/DIG. 8
1440524 6/1976 United Kingdom ............... 156/86
2065552 7/1981 United Kingdom ............... 156/86

Primary Examiner—John E. Kittle
Assistant Examiner—James J. Seidleck
Attorney, Agent, or Firm—Dennis E. Kovach; T. Gene Dillahunty; Herbert G. Burkard

[57] ABSTRACT

A dimensionally heat recoverable article carrying a thermoplastic polymeric material and a heat-softenable adhesive of smaller thickness and lower softening or melting point than the polymeric material is used to encapsulate objects such as joints in cables. The heat-softenable adhesive allows low installation temperature while the polymeric material allows excellent cycling performance to be maintained. The article may be in the form of a wrap-around sleeve.

20 Claims, 5 Drawing Figures

DIMENSIONALLY HEAT RECOVERABLE ARTICLE

This invention relates to dimensionally recoverable articles and particularly to dimensionally heat-recoverable articles.

Heat-recoverable articles are articles the dimensional configuration of which may be made substantially to change when subjected to heat treatment.

Usually these articles recover, on heating, towards an original shape from which they have previously been deformed but the term "heat-recoverable", as used herein, also includes an article which, on heating, adopts a new configuration, even if it has not been previously deformed.

In their most common forms, such articles comprise a heat-shrinkable sleeve made from a polymeric material exhibiting the property of elastic or plastic memory as described, for example, in U.S. Pat. Nos. 2,027,962; 3,086,242 and 3,957,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate stage.

In the production of heat-recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an outer tubular member is held in a stretched state by a second member, such as an inner tubular member, which, upon heating weakens and thus allows the elastomeric member to recover.

In recent years, heat-recoverable articles have gained widespread use for enclosing elongate objects and protecting them from the environment. For example, heat-recoverable articles are often used for enclosing joints in electrical and telecommunication cables or other equipment and for corrosion protection of service lines such as oil pipes and district heating pipes. The articles may be in the form of hollow sleeves that contract radially on heating or they may be in sheet or tape form so that they can be wrapped around the object if the ends of the object are not readily accessible. One form of device that is especially suitable for enclosing such objects is a so-called "wraparound" device that typically comprises a heat-shrinkable polymeric sheet that can be wrapped around the object to be enclosed and then closed by securing together longitudinally extending opposed edge portions of the wrapped sheet. The sheet is then caused to recover tightly about the object to form an environmental seal. Such a device is described in U.K. Pat. No. 1,155,470 the disclosure of which is incorporated herein by reference.

Heat-recoverable articles that are used to protect objects from the environment are usually provided in the direction of recovery with a layer of sealant, e.g. a hot-melt adhesive or a mastic, to form a seal between the object and the heat-recoverable article. With some forms of article, for example splice cases for telecommunication cables, the use of hot-melt adhesives are preferred because they have high cohesive and adhesive strength and because, depending on the composition of the adhesives, they can usually retain their strength at elevated temperatures. If it is desired to increase the maximum working temperature of the article, an appropriate adhesive having a higher melting point is chosen. However in certain circumstances, increasing the melting point of the hot-melt adhesive can cause installation problems. For example, if the article is intended to be installed at low ambient temperatures it may not be possible to supply sufficient heat to the adhesive to melt it without damage to the external surface of the article, especially in view of the fact that the materials from which heat-recoverable articles are formed generally have low thermal conductivities. Another problem that may be encountered is that if the object to be enclosed is itself susceptible to damage by heat and mechanical forces, for example if it includes a cable jacket such as one formed from polyvinyl chloride, low density polyethylene or an ethylene copolymer that is not suitable for use at high temperatures, the object to be enclosed may be damaged at the temperature required to melt the hot-melt adhesive.

The present invention provides an article for enclosing at least part of an object which comprises a dimensionally heat-recoverable cover that is adapted to be recovered about the object and has, extending over at least part of a surface of the cover in the direction of recovery thereof a layer of a heat-softenable adhesive, the article being provided with an intermediate layer of a thermoplastic polymeric material located between the cover and the heat-softenable adhesive so that the material will conform to the cover during recovery of the cover, which material has a melting or softening point that is higher than that of the heat-softenable adhesive and has a thickness that is greater than that of the heat-softenable adhesive.

The present inventon also provides a method of enclosing at least part of an object which comprises, (a) installing around the object a layer of a heat-softenable adhesive;

(b) installing over the heat-softenable adhesive a layer of a thermoplastic polymeric material having a thickness greater and a melting or softening point higher than those of the heat-softenable adhesive;

(c) installing over the thermoplastic polymeric material an article comprising a dimensionally heat-recoverable cover; and (d) causing recovery of the cover, and softening of the heat-softenable adhesive and of the thermoplastic polymeric material.

The thermoplastic polymeric material and the heat-softenable adhesive may be pre-coated on the recoverable cover, so that steps (a), (b) and (c) are carried out simataneously. Alternatively, each of the three components may be applied separately and sequentially. A further possibility is that the recoverable cover is pre-coated only with the thermoplastic polymeric material, and the heat-softenable adhesive is supplied separately for example as an adhesive wrap of one or more layers. The layer or layers supplied on the cover may be coated on the cover, or the composite may be integrally formed.

The thermoplastic polymeric material and the heat-softenable adhesive or one of them may be substantially co-extensive with the recoverable cover, or may overlie only a certain part of the object while the recoverable cover overlies a larger part. In such an arrangement, the two polymeric layers may be localised around cables adjacent a splice whilst the cover encapsulates the polymeric layers and the splice.

As stated above, the thickness of the intermediate layer is greater than that of the layer of heat-softenable adhesive. The intermediate layer of thermoplastic polymeric material preferably has a thickness of at least 60%, and especially at least 70% of the total thickness of the intermediate layer and the layer of heat-softenable adhesive.

The heat-softenable adhesive may be formed from a number of adhesive materials. In general, adhesives commonly referred to as hot-melt adhesives are preferred as the heat-softenable adhesive. Such adhesives will melt, flow and wet the substrate when heated to their melting point or to their softening temperature range. In many cases the heat-softenable adhesive will soften and flow over a temperature range and the softening characteristics of the components may be observed by thermomechanical analysis (TMA) as described in "Thermal Analysis" by T. Daniels published by Kogan Page 1973. Accordingly, the melting point of the reactive components of the adhesive is defined herein as being the temperature at which the TMA probe has penetrated to 60% of the total thickness of the material, usually referred to as $T_{60}$. The TMA data described herein were obtained using a 6.35 mm diameter flat profile probe loaded with a 50 gram weight and by increasing the temperature of the material at a rate of 8° C. per minute. Another useful quantity that can be derived from the TMA plot of the material is the $T_o$ value which is defined herein to mean the temperature corresponding to the point on the TMA plot at which the tangent of the plot at the steepest gradient meets the horizontal line corresponding to zero penetration.

Examples of hot-melt adhesives which may be used include polyamine based adhesives and adhesives based on ethylene copolymers for example ethylene vinyl acetate. Curable adhesives also may be used as the heat-softenable adhesive although it will be appreciated that if the adhesive cures on heating it will, unlike normal hot-melt adhesives, be possible to cause the adhesive to melt only once.

The intermediate layer preferably adheres to, or is bonded to, the cover. It may adhere or be bonded directly to the cover or one or more layers of other material may be located between the intermediate layer and cover if desired.

The intermediate layer of thermoplastic polymeric material may be formed from a hot-melt adhesive. It has been found that materials that are polar, and especially materials having free acid or basic groups, eg. free carboxylic acid or amine groups, are preferred for forming the intermediate layer since these materials adhere well to the polymeric materials usually used for forming dimensionally recoverable articles and also adhere well to the heat-softenable adhesives mentioned above. Preferred materials for forming the intermediate layer include polyamide based hot-melt adhesives, materials based on ethylene-vinyl aceate copolymers having an acid number of at least 5, preferably at least 15, and materials based on ethylene alkyl acrylate copolymers, preferably ethylene-butyl acrylate. The materials may be formed from a single polymeric component that is itself polar or it may have a polar component incorporated therein, in which case the base polymer may itself be polar or non-polar. One such component that may be used with advantage is the ethylene butyl acrylate acrylic acid terpolymer described in UK patent specification No. 2,075,991A. If the intermediate layer does not adhere to the cover, it may be bonded to the cover by another adhesive e.g. a pressure-sensitive adhesive, a cyanoacrylate adhesive or a curable adhesive such as an anaerobic adhesive.

As stated above, thermoplastic polymeric material has a melting or softening point above that of the heat-softenable adhesive. Preferably the difference in temperature is at least 10, especially at least 15 and most especially at least 20° C. The melting or softening point of the intermediate layer will in general depend on the recovery temperature of the cover, the softening temperature range of the intermediate layer and the thermal conductivity of the cover, and should be chosen so that the intermediate layer begins to soften and is sufficiently conformable when the cover has reached its recovery temperature to allow the cover to recover. Thus the $T_{60}$ point as defined above, of the intermediate layer is preferably approximately equal to, or below, the recovery temperature of the cover. In general, it is preferred for the $T_o$ value of the thermoplastic material to be in the range of 30° C. below to 10° C. above the recovery temperature of the cover. Materials having a relatively broad softening temperature range may have a melting point ($T_{60}$) that is in the range of from 30° C. below the recovery temperature of the cover to 30° C. above the recovery temperature of the cover although it may be possible to use even higher melting point materials. Thus, if the cover is formed from a polymeric material based on polyethylene and so has a recovery temperature of about 115° to 120° C., an intermediate layer having a ($T_{60}$) melting point in the range of from 90° to 150° C. is preferred.

The melting or softening point of the heat-softenable adhesive will depend on a number of factors including the intended function of the adhesive, the intended installation temperature of the article, the maximum working temperature of the installed article, the stresses applied to the adhesive after installation and the nature of the object to be enclosed. In general, adhesive melting points of not more than 110 and especially not more than 100° C. are preferred since the majority of recoverable articles are formed from materials based on polyethylene or ethylene copolymers. If the adhesive is a hot-melt adhesive, whether curable or non-curable, it preferably has a melting point of at least 60° C. especially at least 70° C. although curable hot-melt adhesives may have a melting point significantly below these values since their melting behaviour will be altered on curing.

It is possible to form heat-shrinkable articles according to the invention that can withstand relatively high temperatures after installation and/or relatively high internal pressures without failure but which can be installed satisfactorily at relatively low ambient temperatures or on objects that act as a large "heat sink", the term "heat-sink" referring to substrates that have a relatively high thermal conductivity and are sufficiently large that they transmit heat away from the adhesive bond line and so prevent the adhesive melting properly. The presence of an adhesive of relatively low melting point that forms a bond with the object enables the article to be installed at relatively low ambient temperatures, but it has surprizingly been found that the maximum temperature and pressure that the installed article can withstand appears to depend at least partly on the physical properties of the intermediate layer of higher melting point rather than, as would be expected, on the lower melting point of the heat-softenable adhesive. Thus, for example, in certain cases it is possible to form an article which, when installed, will withstand a temperature of 60° C. at an internal pressure of 40 kPa but which can be installed at an ambient temperature as low as 0° C. or, in some cases even lower, for example as low as −10° C. This is particularly surprizing in view of the observation that only very little mixing of the two layers occurs.

In addition to excellent results under static conditions, the article of the invention shows a surprising ability to cycle up to 70° C. at pressures up to, say, 40 KPa especially for smaller sizes. Even large size cable splice enclosures can cycle easily up to 30 KPa. Improved creep resistance was also noticed.

The article according to the invention has the further advantage that not only may it be installed on objects that are themselves sensitive to high temperatures such as, for example, telecommunication cables having p.v.c., low density polyethylene or ethylene copolymer jackets, but that in many cases, the risk of overheating the object is reduced even with too high an input of heat to the heat-shrinkable cover, as may, for example occur when the article is installed by an unskilled operator. Without in any way limiting the scope of the invention, it is believed that the tolerance of the article to excess heating is due to the fact that once the article has been heated sufficiently to cause adhesive to melt or soften and to cause the intermediate layer to begin to soften, any excess heat applied to the article will be absorbed by the intermediate layer in causing it to melt or soften further, without the temperature of the heat-softenable adhesive rising until the intermediate layer has fully melted. Thus, in a number of cases where the temperature sensitivity of the object to be enclosed is a potential problem it is advantageous for the intermediate layer to be formed from a semi-crystalline material.

Yet another advantage of the article according to the invention is that, in a number of cases, it reduces the total cost of the installed article. Thus, for example, where a polyamide based heat-softenable layer is combined with a non-polyamide intermediate layer, the total cost of the adhesive is reduced as compared with a single layer polyamide coated article, since polyamides are generally more expensive than other hot-melt adhesives, without detriment to the quality of the adhesive bond formed. In other instances, for example where the article is to be recovered over temperature sensitive cables, the necessity for cable protection devices such as described in British Pat. No. 2075771A is obviated.

Also the article may in a number of cases, be used successfully to cover objects having a diameter that is less than the diameter of the fully recovered article. This is because the thickness of the intermediate layer increases as the article recovers and so acts as if it increases the size of the object with regard to the cover and, whilst the heat softenable adhesive has a sufficiently low softening or melting point to be able to wet the object to be enclosed, the intermediate layer will have a sufficiently high viscosity during recovery, due to its higher melting or softening point, not to flow away from its intended position between the object and cover.

The articles according to the invention may be formed in a number of configurations for example in the form of hollow tubular articles that are made by moulding or extrusion, or in the form of sheet or tape. For some articles it may be desirable to coat one entire surface with both layers whilst for other articles it may be necessary or desirable only to coat certain parts of the article with both layers and to leave other areas uncoated or coated with only one of the layers.

Thus, for example, the article may be in the form of a wraparound device as described in U.K. Pat. No. 1,155,470 and as mentioned above. This form of device has a closure device extending along each of two longitudinally extending edge portions and is so arranged that, when the closure elements are brought together a flap extending along one edge portion lies under the opposite edge portion. In the region of the overlap it may be desirable to coat one or both the edge portions with only one of either the heat-softening adhesive or the thermoplastic polymeric material in view of the increased thickness of the article in that region. For example, in some instances it may be preferable for the flap region of the article to be coated only with a layer of the heat softenable adhesive and not with the intermediate layer.

Such devices are generally in the form of sleeves designed to encapsulate a cable splice or other elongate substrate. The device is installed around the substrate (in this case by wrapping but if it were tubular it would be slid over a free end of the substrate) and then recovered into engagement. In most cases it is necessary in order to provide an environmental seal to bond only the ends of the sleeve to the substrate. For this reason, the sleeve need be recoverable only at its ends, the internal adhesive may be provided only at the ends of the sleeve, or both. The substrate may first be surrounded by a liner over which the sleeve is installed; such a liner provides support for the sleeve and in order to prevent wicking of moisture vapour between the sleeve and the liner it may be desirable to provide a bond between the two, in which case the entire surface of the sleeve may be coated with the adhesive.

Where a bond is necessary only at the ends of the sleeve, the adhesive may be provided as strips at each end of the sleeve. The adhesive will thus provide not only a mechanically strong bond between the sleeve and the substrate, but also a seal to prevent the passage of fluid.

Usually the or each surface of the sleeve or other article that is provided with such a seal is located on an edge portion of the article since any leak path for fluid will cross one of the edges of the article. In this case the sealing elements extend in a direction substantially parallel to the edge. Thus, one form of the article according to the invention may have a hollow, substantially tubular configuration having one or more outlets through which the substrate to be enclosed will extend and the sealing elements are annular and extend circumferentially around that part of the internal surface of the sleeve in the region of one or more of the outlets. The sleeve may have any members of outlets, for example it may be blind at one end in the form of an end cap, or it may be open at two ends, or it may be in the form of an udder (a term employed herein in a general sense to cover any hollow dimensionally recoverable article having at least three outlets employed in the termination of cables and also in cable breakouts).

In addition to providing bonding and sealing, the adhesive layers at the outlets also can provide a build-up of diameter to match the size of the sleeve and can protect the substrate from the heat or mechanical streses arising during recovery.

Figure 2:
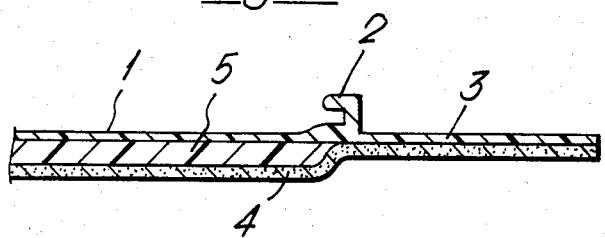
Figure 3:
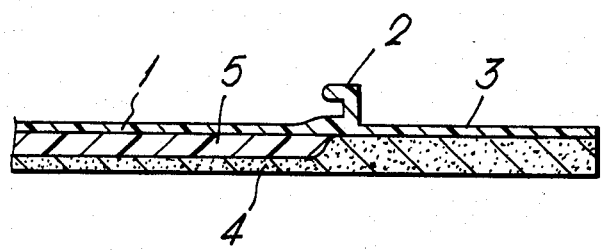
Figure 4:
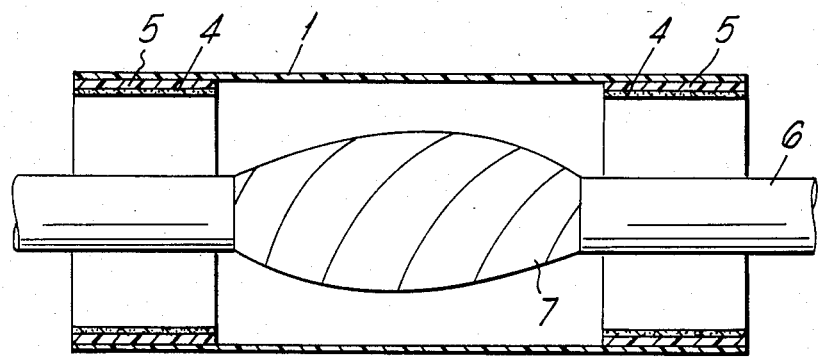
Figure 5:
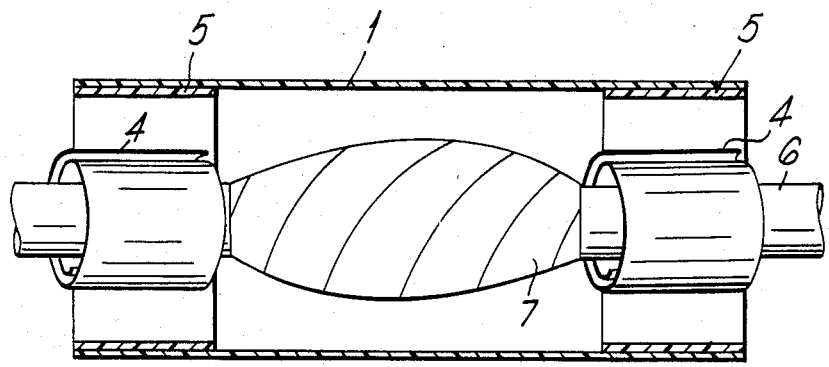

Several embodiments of the article according to the invention will now be described with reference to the accompanying drawings in which:

FIGS. 1 to 3 are schematic transverse sections through part of three different articles according to the invention in the form of wraparounds; and FIGS. 4 and 5 show tubular articles around a cable splice.

Referring to the accompanying drawings, FIGS. 1 to 3 show an edge portion of a heat-recoverable wraparound article having the general closure configuration as described in U.K. Pat. No. 1,155,470 although other closure arrangements could be used or the article may be tubular. The article comprises a dimensionally recoverable cover 1 part of which is shown, the cover being provided with a longitudinally extending rail 2 and a flap portion 3. When the article is to be installed, it is wrapped around the object and the corresponding edge portion (not shown) of the cover which is provided at its edge with a corresponding rail, is caused to overlie the flap portion 3 so that the two rails are in abutment. The installer then slides a channel over the rails to maintain them in abutment and heats the cover for example with a gas torch to cause it to recover tightly about the object.

The article is provided with a layer 4 of a heat-softenable adhesive and an intermediate layer 5 of a thermoplastic material, the thickness of the layers 4 and 5 being exagerated for the sake of clarity, the intermediate layer 5, preferably formed from a hot-melt adhesive, has an initial softening point in the region of the recovery temperature of the cover 1 and the heat-softenable layer 4 has a melting or softening point, as hereinbefore defined, that is at least 10° C. below the melting or softening point ($T_{60}$) of the intermediate layer 5. The average thickness of the intermediate layer is approximately three times that of the heat-softenable adhesive, and the total thickness of both layers is approximately 0.4 to 1.4 mm preferably 0.6 to 1.2 mm.

As shown if FIG. 1, both layers extend over the flap portion 3 of the article. This arrangement is suitable for systems in which no problems are encountered with heating the heat-softening layer 4 under the flap portion. FIGS. 2 and 3 show modifications in the design of the article which are suitable in circumstances in which it may be difficult to heat the heat-softenable layer 4 under the flap portion due to the presence of the overlying part of the cover. Such circumstances may exist when the ambient temperatures are particularly low or if it is not possible to pre-heat the object to be enclosed. In the modifications shown in FIGS. 2 and 3, the intermediate layer 5 ends at the rail 2 and only the heat-softenable layer 4 extends along the flap portion 3 either with constant thickness of the heat-softenable layer as shown in FIG. 2 or with the total thickness of adhesive being constant as shown in FIG. 3.

FIGS. 4 and 5 show tubular articles having localized regions of heat-softening layer 4 and intermediate layer 5 around a splice 7 between cables 6. The article 1 may of course be of wrap-around form for this application or for use with this configuration of adhesive layers. The article 1 is shown before recovery, and after recovery it will conform to the size and shape of the cable splice or of aliner if such is provided. In FIG. 4 the two layers 4 and 5 are carried by the article 1, whereas in FIG. 5 the layer 4 is provided separately, for example as an adhesive wrap.

The following Examples illustrate the invention.

EXAMPLE 1

Blends of a polyamide based adhesive having a relatively low melting point (sample 1A) and a polyamide based adhesive having a relatively high melting point (sample 2A) were formulated as shown in table I.

TABLE I

| COMPONENTS | Parts by Weight | |
| --- | --- | --- |
| | SAMPLE 1A | SAMPLE 2A |
| Versalon 1300 (trade name) Polyamide sold by Henkel | 100 | 100 |
| Irganox 1010 (trade name) - antioxidant | 1.5 | 1.5 |
| Ethylene/butyl acrylate/acrylic acid terpolymer | | |
| Lupolene A2910 M (trade name of BASF) | 30 | 25 |
| Ethylene acrylic acid copolymer | 5 | 20 |
| Vinyl terminated butadiene nitrile copolymer | 2.5 | |
| Oppanol B3 | | 30 |
| Plasticizer | | 15 |
| TMA $T_0$/°C. | 86 | 68 |
| TMA $T_{60}$ (melting point)/°C. | 98 | 75 |

Two heat-shrinkable telecommunication splice cases based on cross-linked polyethylene corresponding to those sold by N. V. Raychem S. A. (Belgium) under the trade name VASM but which had not yet been coated with adhesive were each coated internally with one of the samples 1A and 2A to a thickness of 0.8 mm. A third splice case was coated with sample 1A adhesive to a thickness of 0.6 mm and then with an overlying layer of sample 2A to give a total adhesive thickness of 0.8 mm.

The samples were recovered about a telecommunication cable of 35 mm diameter in accordance with Raychem standard installation instructions for the "XAGA 200" splice case published by Raychem Telecommunications Division, Kessel-lo, Belgium, and the installed articles were subjected to a temperature cycle test in which, for each cycle, the temperature was raised from 23° C. to +60° C. over a period of one hour and maintained at 60° C. for 4 hours, then reduced to −30° C. over a period of 2 hours, then maintained at −30° C. for 4 hours and finally returned to 23° C. over a period of one hour. During the temperature cycling the internal pressure of the cable was maintained at 40 kPa, and failure of the splice case was determined by leakage of the internal pressurising fluid. The results are shown in table II.

TABLE II

| Adhesive coating | Minimum installation temperature | No. of cycles to failure |
| --- | --- | --- |
| Sample 1A (0.8 mm) | 0° C. | >50 |
| Sample 2A (0.8 mm) | −20° C. | <2 |
| Sample 1A (0.6 mm) + Sample 2A (0.2 mm) | −10° C. | >130 |

From Table II it can be seen that the article according to the invention having both layers could be installed at lower ambient temperatures than that using the high temperature adhesive without any reduction in high temperature cycling performance.

EXAMPLE 2

Example 1 was repeated using the formulations shown in table III for the intermediate layer (samples 1B, 1C and 1D) and the overlying adhesive layer (samples 2B, 2C, 2D and 2E).

Articles were prepared with combinations of an intermediate layer of 0.6 mm thickness formed from samples 1B to D and overlying layer of thickness 0.2 mm formed from samples 2B to E, and were installed on a telecommunication cable as in Example 1. The article was considered to be properly installed if it was pressure-tight after installation without the need to heat the article after it had recovered onto the cable.

After installation the articles were subjected to temperature cycling as described in Example 1. The articles were considered to have passed the cycling test if they could withstand at least 10 cycles. A number of articles of each adhesive layer combination were installed at room temperature, 0° C. and −10° C., and the lowest installation temperatures for which the articles will pass the cycling test are shown in table IV.

TABLE III

| | | PARTS BY WEIGHT | | | | | | |
|---|---|---|---|---|---|---|---|---|
| | | Intermediate layer | | | Heat-softenable adhesive layer | | | |
| Components | Trade name | 1B | 1C | 1D | 2B | 2C | 2D | 2E |
| Polyamide | Versalon 1300 | | 10 | 100 | 100 | 100 | | 100 |
| Antioxidant | Irganox 1010 | 1.5 | 1.5 | 1.5 | 1.5 | 1.5 | | 1.5 |
| Ethylene butyl acrylate acrylic acid terpolymer | Lupolene A2910M | 30 | 90 | 50 | 30 | | 20 | 25 |
| Ethylene/acrylic acid copolymer | | | | 20 | 20 | 20 | 20 | 20 |
| Vinyl terminated butadiene nitrile rubber | | | | 2.5 | 2.5 | | 2.5 | |
| Polyamide | Versalon 1140 | 100 | | | | | | |
| Tackifier | Oppanol B3 | | | | | | | 30 |
| Plasticiser | | | | | | | 7.5 | 15 |
| Pigment | | | | | 0.3 | 0.3 | 0.3 | 0.3 |
| Dimer acid based polyamide | | | | | | | 100 | |
| Low density polyethylene | | | | | | | 7.5 | |
| Polyamide | Versamid 100 | | | | | | 80 | |
| Melting Point (T$_{60}$)/°C. | | 147 | 141 | 106 | 94 | 88 | 82 | 78 |

TABLE IV

| SAMPLE | SAMPLE 1B–1D | | |
|---|---|---|---|
| 2B–2E | 1B | 1C | 1D |
| T$_{60}$ | 147° C. | 141° C. | 106°C. |
| 2B 94° C. | R.T. | R.T. | −10° C. |
| 2C 88° C. | R.T. | 0° C. | −10° C. |
| 2D 82° C. | 0° C. | 0° C. | −10° C. |
| 2E 78° C. | 0° C. | 0° C. | −10° C. |

EXAMPLE 3

Example 1 was repeated using the materials shown in table V as the intermediate layer.

TABLE V

| | | Weight Percent | |
|---|---|---|---|
| Component | Trade name | Sample 1E | Sample 1F |
| Polyethylene | News 8001 | 76 | |
| Polyethylene | News 8009 | | 76 |
| Ethylene acrylic acid copolymer | | 9.5 | 9.5 |
| Ethylene vinyl acetate copolymer | Elvax 4320 | 9.5 | 9.5 |
| Ethylene propylene rubber | Epcar 306 | 5 | 5 |
| M.F.I. (g/10 mm) | | 4.6 | 11.7 |

The thickness of the intermediate layer was 0.5 mm, and a 0.1 mm thick coat of the polyamide adhesives shown in table VI was applied out the intermediate layer. Sample 2F was used in conjunction with sample 1F and sample 2G was used with sample 1E. These articles, which are less expensive to produce than those using a polyamide intermediate layer, will withstand temperature cycling tests between −30° C. and +60° C. at an interval pressure of 40 kPa.

TABLE VI

| | | Parts by weight | |
|---|---|---|---|
| Component | Tradename | Sample 2F | Sample 2G |
| Polyamide | | 66.5 | 47.5 |
| Vinyl terminated Polybutadiene nitrile | | 3.5 | 2.5 |
| Antioxidant | Irganox 1010 | 1.5 | 1.5 |
| Ethylene/butyl acrylate/ acrylic acid terpolymer | Lupolene A2910M | 20 | 40 |
| Ethylene acrylic acid copolymer | | 10 | 10 |
| TMA T$_0$/°C. | | 79 | 95 |
| TMA T$_{60}$/°C. | | 96 | 105 |

EXAMPLE 4

Example 1 was repeated using a 0.5 mm thick layer of an ethylene vinyl acetate copolymer sold under the trade name Elvax 240 as the intermediate layer and a 0.1 mm thick layer of a polyamide adhesive (sample 2L table IX below). The installed article withstood 62 temperature cycles between −30° C. and +60° C. at 40 kPa internal pressure without failure.

EXAMPLE 5

Example 1 was repeated using heat-shrinkable splice cases numbered 1 to 3 having the dimensions:

| Splice Case | maximum initial diameter/mm | minimum recovered diameter/mm | length mm |
|---|---|---|---|
| 1 | 50 | 15 | 445 |
| 2 | 76 | 22 | 665 |
| 3 | 101 | 30 | 375 |

The splice cases were in the form of wraparounds having a rail and channel closure as described in British Pat. No. 1,155,470.

A 0.6 mm layer of an ethylene-vinyl acetate based coextrusion resin sold by duPont under the trade name CXA2002 was used as the intermediate layer and a 0.2 mm thick layer of two polyamide adhesives (Raychem Corporation designation S1156 and S1182) as the overlying layer. The splice cases were installed so that one cable entered one end of the splice case and two or more cables entered the other end, the end of the splice case having two or more cables being formed as a "branch-off" using one or more clips as described in British Pat. No. 1,604,981 coated with the same adhesive as the overlying layer.

The ethylene vinyl acetate adhesive had an M.F.I. of 10 g min$^{-1}$ at 190° C., a $T_o$ of 94° C., a melting point ($T_{60}$) of 116° C., an acid number of 67 and a rolling drum peel strength to flame brushed polyethylene of 130N/25 mm at room temperature and 75N/25 mm at 60° C.

The installed splice cases were subjected to temperature cycling tests at temperatures of $-30°$ to $*60°$ C. under an internal pressure of 40 kPa. Information on the installed articles and temperature cycling is shown in table VII.

TABLE VII

| Polyamide | Splice Case | Cables | No. of cycles | Failure mode |
|---|---|---|---|---|
| S1156* | 3 | 1 in 28 mm dia 2 out 28 mm dia | 242 | no failure |
| S1182* | 3 | 1 in 28 mm dia 2 out 28 mm dia | 212 | no failure |
| S1182* | 1 | 1 in 10.5 mm dia 3 out 11 mm, 9 mm, 7.5 mm dia | 162 | no failure |
| S1182* | 2 | 1 in 18 mm dia 3 out 18 mm, 13.5 mm 10.5 mm dia | 160 | no failure |

*Raychem Corp. trade designation for hot-melt adhesive.

EXAMPLE 6

Example 5 was repeated using a 0.5 mm thick layer of various ethylene-butyl acrylate/ethylene-propylene rubber blends shown in table VIII as the intermediate layer and a 0.1 to 0.2 thick layer of various polyamide based hot-melt adhesives shown in table IX as the overlying adhesive layer. The splice case used was as described for case No. 3 in Example 5, and various adhesive coating configurations for the flap region were used as shown in the drawings. The results are shown in table X.

TABLE VIII

| Composition | Trade name | 1G | 1H | 1J | 1K |
|---|---|---|---|---|---|
| Ethylene-butyl acrylate-acrylic acid terpolymer | Lupolene A2910M (BASF) | 40 | 32.5 | 32.5 | 60 |
| Ethylene-butyl acrylate copolymer | DXM410 (Unifos) | 40 | 32.5 | 32.5 | 20 |
| Ethylene acrylic acid copolymer |  | 15 | 10 | 10 | 20 |
| E.V.A. | Elvax 4320 |  |  | 15 |  |
| Ethylene-propylene rubber | Epcar 306 | 5 | 25 | 10 |  |
| Peel strength to flame brushed polyethylene (N/25 mm) |  |  |  |  |  |
| Room Temp. |  | 31.3 | 194.2 | 49.6 | 61 |
| 50° C. |  | 8.3 | 22.4 | 9.8 | — |
| TMA $T_0$/°C. |  | 101 | 101 | 101 | 102 |
| $T_{60}$/°C. |  | 123 | 127 | 114 | 116.5 |
| MFI at 190° C. (g/10 min) |  | — | 4.0 | 11.5 | — |

TABLE IX

| COMPONENTS | TRADE NAME or Supplier | 2H | 2J | 2K | 2L |
|---|---|---|---|---|---|
| Dimer acid Polyamide | Versalon 1300 | 100 |  |  | 20 |
| Dimer acid Polyamide | Schering |  |  |  | 80 |
| Dimer acid Polyamide | Henkel |  | 66.5 |  |  |
| ethylene vinyl acetate copolymer | Elvax 4320 |  |  | 77.6 |  |
| vinyl terminated butadiene nitrile rubber |  | 2.5 | 3.5 |  | 3 |
| Ethylene butyl acrylate acrylic acid terpolymer | Lupolene A2910M | 10 | 20 |  | 17.5 |
| Ethylene/acrylic acid copolymer |  |  | 10 | 19.4 | 15 |
| ethylene/propylene rubber | Epcar 306 |  |  | 1.5 |  |
| 12 hydroxystearic acid | Radiacid/ Oleofina |  |  | 1.5 |  |
| Polyethylene wax | A wax 100 |  |  |  | 7.5 |
| Acrylic rubber | Hycar 4054 | 0.3 |  |  |  |
| Dodecenyl succinic Anhydride | DSA (Shell) | 2 |  |  |  |
| Antioxidant | Irganox 1010 | 1 | 1.5 |  | 1 |
| Physical Properties |  |  |  |  |  |
| TMA $T_0$/°C. |  | 86 | 73–75 | 75 | 69 |
| TMA $T_{60}$/°C. |  | 96 | 90 | 82 | 82 |

TABLE X

| Intermediate Layer | Overlying Layer | Cycling Temp/°C. | Pressure/kPa | No. of cycles | Adhesive configuration of flap FIG. NO. |
|---|---|---|---|---|---|
| 1G | S1156* | −30/+60 | 10 | 72 | 1 |
| 1H | Sample 2H | −20/+50 | 40 | 48 | 2 |
| 1H | Sample 2J | −20/+50 | 40 | 60 | 2 |
| 1H | S1156* | −30/+60 | 40 | 60 | 3 |
| 1H | S1182* | −30/+60 | 40 | 50 | 3 |
| 1H | S1182* | −30/+60 | 10 | 76 | 3 |
| 1K | S1156* | −30/+60 | 40 | 210 | 1 |
| 1J | S1156* | −30/+60 | 40 | 52 | 1 |

*Raychem Corp trade designation for polyamide hot-melt adhesive.

EXAMPLE 7

Example 1 was repeated using a 0.6 mm thick intermediate layer formed from one of samples 1H (Table VIII) 1L (shown in Table XI below) or CXA2002 of Example 5 and a 0.2 mm thick overlying layer formed from sample 2K (shown in Table X above) or Raychem hot melt adhesive S1181. The temperature cycling results are shown in Table XII below.

TABLE XI

| Composition | Trade Name | Intermediate Layer 1L (Parts by weight) |
| --- | --- | --- |
| EVA | Elvax 4320 | 49.5 |
| EVA | Elvax 3128 | 40.5 |
| Ethylene acrylic copolymer | | 10 |

EXAMPLE 8

Example 1 may be repeated using a 0.6 mm thick intermediate layer of sample 1A and a 0.2 mm thick layer of a curable adhesive composition described in Example 5 of copending U.K. Pat. No. 8127629. The resulting article can be recovered on a cable and temperature cycled as described in Example 1 without failure.

TABLE XII

| Intermediate layer | Overlying layer | Temperature cycling Temperature/°C. | Pressure/kPa | No. of cycles |
| --- | --- | --- | --- | --- |
| 1H (table VIII) | 2K | −20/+50 | 40 | 32 |
| 1H (table VIII) | S1181 | −20/+50 | 40 | 16 |
| 1L (table X) | S1181 | −20/+50 | 40 | 28 |
| CXA2002 (Example 5) | S1181 | −20/+50 | 40 | 154 |

We claim:

1. An article for enclosing at least part of an object, comprising:
   a dimensionally heat-recoverable cover adapted to be recovered about the object;
   a layer of a heat-softenable adhesive adapted to contact the object;
   an intermediate layer of a thermoplastic polymeric material located between the cover and the heat-softenable adhesive, the polymeric material bonding to both the cover and adhesive during recovery of the cover, which material has a melting or softening point that is higher than that of the heat-softenable adhesive and has a thickness that is greater than that of the heat-softenable adhesive.

2. An article as claimed in claim 1, wherein the intermediate layer has a thickness of at least 70% of the total thickness of the intermediate layer and layer of heat-softenable adhesive.

3. An article as claimed in claim 1, wherein the total thickness of the intermediate layer and the layer of heat-softenable material is in the range of 0.3 to 3 mm.

4. An article as claimed in claim 1, wherein the heat-softenable material is a hot-melt adhesive.

5. An article as claimed in claim 4, wherein the heat-softenable adhesive has a melting point, as hereinbefore defined, of not more than 110° C.

6. An article as claimed in claim 4, wherein the heat-softenable adhesive has a melting point, as hereinbefore defined, of at least 60° C.

7. An article as claimed in claim 1 wherein the intermediate layer has a $T_o$ as hereinbefore defined in the range of from 30° C. below the recovery temperature of the cover to 10° C. above the recovery temperature of the cover.

8. An article as claimed in claim 1, wherein the thermoplastic material has a melting point, as hereinbefore defined, of at least 10° C. above the melting point of the heat-softenable adhesive.

9. An article as claimed in claim 8, wherein the thermoplastic material has a melting point of at least 20° C. above the melting point of the heat-softenable adhesive.

10. An article as claimed in claim 1, in the form of a wrap-around device wherein the cover includes a flap portion extending along one edge portion that is, in use, intended to be underneath an opposite edge portion, the flap portion being coated with only one of the thermoplastic material and the heat-softenable adhesive.

11. An article as claimed in claim 10, wherein the flap portion is coated with the heat-softenable adhesive.

12. An object, at least part of which has been enclosed by means of an article as claimed in claim 1.

13. An object according to claim 12, being a cable or a pipe, or a joint in a cable or a pipe.

14. An article as claimed in claim 1, wherein the polymeric material contacts confronting surfaces of the adhesive and the cover.

15. A method of enclosing at least part of an object, comprising the steps of:
   (a) installing around the object a layer of a heat-softenable adhesive;
   (b) installing over the heat-softenable adhesive a layer of a thermoplastic polymeric material having a thickness greater and a melting or softening point higher than those of the heat-softenable adhesive;
   (c) installing over the thermoplastic material a dimensionally heat-recoverable cover; and
   (d) causing recovery of the cover, and softening of the heat-softenable adhesive and of the thermoplastic polymeric material such that the polymeric material bonds with the cover and the adhesive.

16. A method according to claim 15, in which steps (a), (b) and (c) are carried out by installing around the object a dimensionally-recoverable cover carrying the thermoplastic polymeric material and the heat-softenable adhesive.

17. A method according to claim 15, which includes installing around the object a heat-softenable adhesive, and installing a cover carrying the thermoplastic polymeric material.

18. A method according to claim 15, in which the object is a cable or a pipe, or a joint in a cable or a pipe.

19. A kit-of-parts for enclosing at least part of an object which comprises:
   (a) an article comprising a dimensionally recoverable cover;
   (b) a heat-softenable adhesive which can be wrapped around the object; and
   (c) a thermoplastic polymeric material which can be installed around the object between the cover and the heat-softenable adhesive; the thermoplastic polymeric material when installed having a thickness greater and a melting or softening point higher than the heat-softenable adhesive and being bonded to both the adhesive and the cover.

20. A method according to claim 15, which includes forming the polymeric material essentially from an adhesive.

* * * * *

UNITED STATES PATENT AND TRADEMARK OFFICE
CERTIFICATE OF CORRECTION

PATENT NO. : 4,521,470

DATED : June 4, 1985

INVENTOR(S) : Overbergh et al

It is certified that error appears in the above-identified patent and that said Letters Patent is hereby corrected as shown below:

In column 2, line 64, the spelling of "simultaneously" should be corrected.

In column 4, line 1, the spelling of "acetate" should be corrected.

In column 7, line 9, the spelling of "stresses" should be corrected and in line 49, the word "if" should read --in--.

In column 8, line 5, there should be a space between "a" and "liner" and in line 64, the data "-10°C" and "> 130" should appear in line 65 and not line 64.

In column 11, line 37, "*60°C" should read --+60°C--.

In column 13, line 24, the word "Application" should be inserted after "Pat.".

Signed and Sealed this

Eighth Day of March, 1988

Attest:

DONALD J. QUIGG

Attesting Officer

Commissioner of Patents and Trademarks